UNITED STATES PATENT OFFICE.

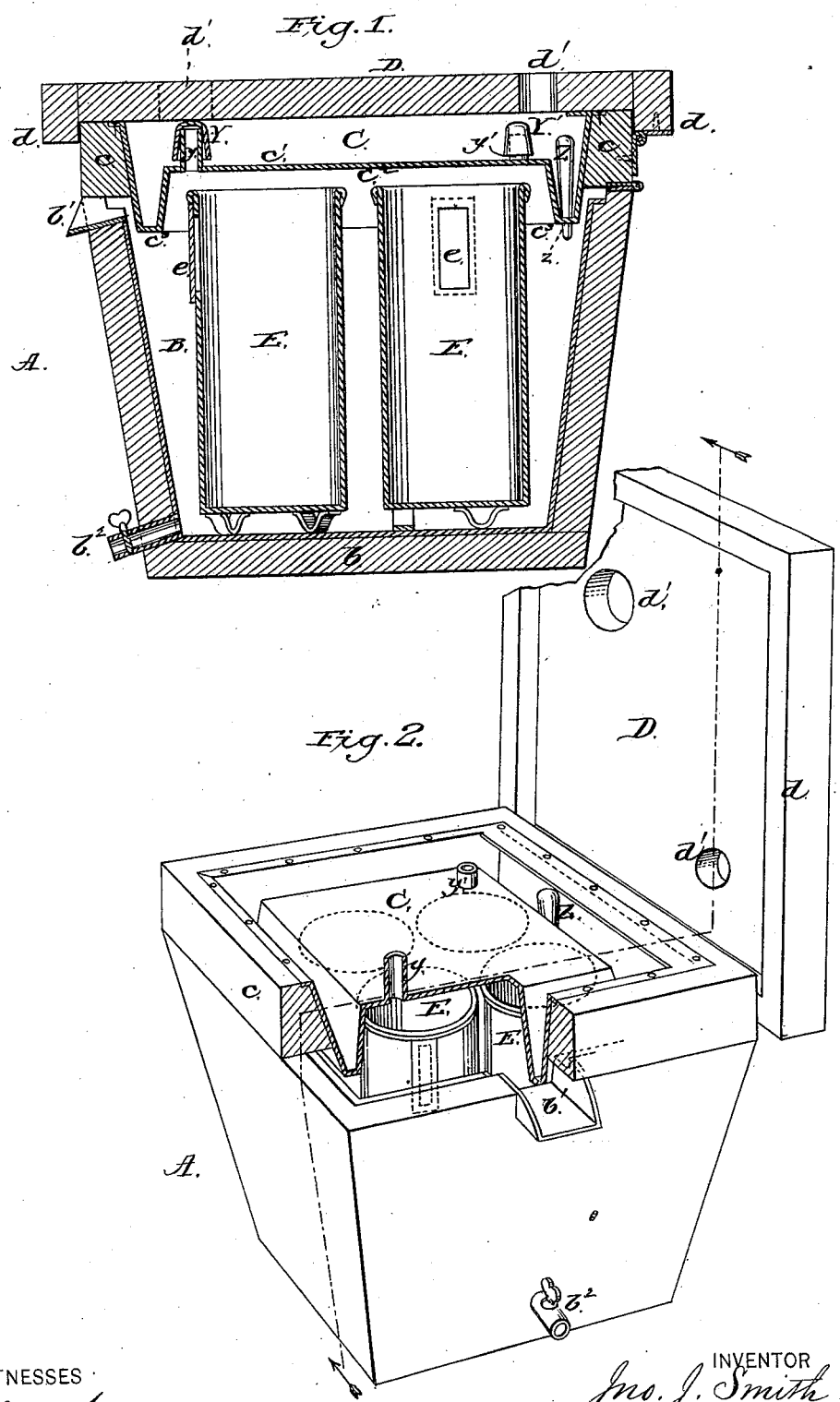

JOHN J. SMITH, OF MARYVILLE, MISSOURI.

MILK-COOLER.

SPECIFICATION forming part of Letters Patent No. 242,385, dated May 31, 1881.

Application filed February 19, 1881. (No model.)

*To all whom it may concern:*

Be it known that I, JOHN J. SMITH, a citizen of the United States, resident at Maryville, in the county of Nodaway and State of Missouri, have invented certain new and useful Improvements in Milk-Coolers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a vertical section. Fig. 2 is a perspective view, partly in section.

This invention relates to creamers, or devices for raising cream on milk.

The invention consists in the construction hereinafter described, and particularly pointed out in the claim.

In the annexed drawings, A is a box or other suitable receptacle, having body B, inside cover, C, and outside cover, D.

The body B consists of sides preferably slanting inward to the bottom $b$. This body B is lined with metal, and has the overflow $b'$ above and discharge $b^2$ at bottom.

E are the pails into which the milk is to be poured. When seated in the receptacle the edges of these pails are above the edges of body B and about an inch above overflow $b'$.

$e$ are the gages for showing the depth of cream.

The inner cover, C, consists of a frame, $c$, hinged to body B, and having the metal top $c'$ fastened to the upper edges. This top $c'$ has an upturned middle, $c^2$, of a size to cover the pails, and a downward projection, $c^3$, all around, which, when the cover is down, comes around the tops of the pails and extends below the bottom of the overflow $b'$. In this projection $c^3$ is a hole, $z$, with a plug, Z.

Rising from the corners of middle $c^2$ are the tubes $y\ y'$, having caps Y Y', one, $y'$, being shorter than the other.

Outside cover, D, is hinged to inside cover, C, and has a flange, $d$, which fits tight around the frame of the inside cover.

In the cover D are one or two holes, $d'$, leading within.

In using this device milk is strained into the pails, plug Z inserted, and caps Y Y' removed and the covers closed tight, the discharge $b^2$ being closed. Cold water is poured in through one of the openings, $d'$, and as it rises in the cover C to the top of the shorter tube $y'$ it flows through into body B around the pails, and, as it rises, out at overflow $b'$. This cools the milk and causes the cream to rise. The heat and odor pass off through tube $y$ and the opening $d'$. The difference in the heights of these two tubes $y\ y'$ conduces to this beneficial result. As water is poured into cover C it fills the same up to the top of tube $y'$, leaving the top of tube $y$ above the surface of the water. In this way the milk is surrounded with water, being continually supplied, which closes the short tube $y'$; but the longer tube $y$ carries off all the heat and odor, after which the caps are put on, the cover filled with water, and the device left until the cream rises. The projection $c^3$, coming down below the overflow $b'$, seals the water in the body of the vessel B, and, as the water in the cover C becomes heated and fresh water is pumped in, it rises, and, passing down tube $y'$, is carried off with the heated water below through the overflow. After the milk has become cool the caps Y Y' can be placed on and the water-supply cut off, leaving the cream to rise.

The cream is to be skimmed off as usual.

To take out the pails or to get at the cream, the holes $z$ and $b^2$ are opened, the water let off, and the cover lifted.

What I claim is—

The combination of body B, inner hinged cover, C, having downward projection $c^3$, and upwardly-extending tubes $y\ y'$, having removable caps Y Y', one of said tubes being longer than the other, and outer lid, D, having the filling-holes, the whole forming a water-sealed creamer, wherein a constant stream of water can be supplied through the shorter tube and heat and odor passed out the longer tube, and then both be closed and the inner cover filled with water, as set forth.

In testimony whereof I affix my signature in presence of two witnesses.

JOHN J. SMITH.

Witnesses:
J. M. HOSMER,
EDWIN E. MIGBELL.